(12) United States Patent
Yang

(10) Patent No.: US 9,904,640 B2
(45) Date of Patent: Feb. 27, 2018

(54) PROGRAM LOADING SYSTEM FOR MULTIPLE MOTHERBOARDS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 383 days.

(21) Appl. No.: 14/806,327

(22) Filed: Jul. 22, 2015

(65) Prior Publication Data
US 2016/0335097 A1 Nov. 17, 2016

(30) Foreign Application Priority Data
May 11, 2015 (CN) .......................... 2015 1 0235212

(51) Int. Cl.
*G06F 9/24* (2006.01)
*G06F 13/40* (2006.01)

(52) U.S. Cl.
CPC .................. *G06F 13/4022* (2013.01)

(58) Field of Classification Search
CPC .................................................. G06F 13/4022
See application file for complete search history.

(56) References Cited

U.S. PATENT DOCUMENTS

| 2009/0089571 | A1* | 4/2009 | Fu | G06F 9/4405 713/2 |
| 2013/0173833 | A1* | 7/2013 | Zou | G06F 13/4022 710/301 |
| 2014/0365755 | A1* | 12/2014 | Liu | G06F 21/572 713/2 |

* cited by examiner

*Primary Examiner* — Kim Huynh
*Assistant Examiner* — Eric Chang
(74) *Attorney, Agent, or Firm* — ScienBiziP, P.C.

(57) ABSTRACT

A program loading system effective for several different types of motherboard includes a first storage module, a first control module, first switch module, and a type module. The first control module is coupled between the first storage module and the first switch module. The first switch module is coupled between the first switch module and the type module. When a program stored in the first storage module is needed to be loaded, the first switch module is turned on. The type module outputs a motherboard type signal to the first control module through the first switch module. The first control module loads the program selectively according to the type signal received.

10 Claims, 4 Drawing Sheets

PROGRAM LOADING SYSTEM FOR MULTIPLE MOTHERBOARDS

FIELD

The subject matter herein generally relates to program installation.

BACKGROUND

A plurality of types of motherboards with different standards of firmware and BIOS are provided for meeting different needs of users. It is a waste of manpower when a number of programs are loaded for a single motherboard.

BRIEF DESCRIPTION OF THE DRAWINGS

Implementations of the present technology will now be described, by way of example only, with reference to the attached figures.

DETAILED DESCRIPTION

Figure 1:
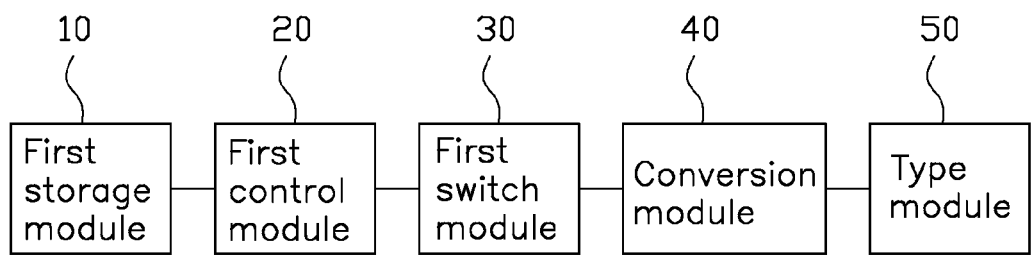
FIG. 1 is a block diagram of a first example embodiment of a loading system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a loading system 100 for loading programs.

FIG. 1 illustrates a first embodiment of the loading system 100. The loading system 100 can comprise a first storage module 10, a first control module 20, a first switch module 30, a conversion module 40, and a type module 50. The first control module 20 is coupled between the first storage module 10 and the first switch module 30. The conversion module 40 is coupled between the switch module 30 and the type module 50. In at least one embodiment, the loading system 100 is positioned on a motherboard and the type module 50 is configured to determine a type of the motherboard.

When a program stored in the first storage module 10 is needed to be loaded, the first switch module 30 is turned on. The conversion module 40 converts a type signal outputted from the type module 50, and outputs the type signal converted to the first control module 20 through the first switch module 30. The first control module 20 selectively loads the program stored in the first storage module 10 according to the type signal received.

In at least one embodiment, the type signal outputted from the type module 50 can comprise a structure signal, a function signal, and a central processing unit (CPU) signal. In at least one embodiment, the conversion module 40 is configured to convert the type signal to a matching signal corresponding to the first control module 20. In other embodiments, the conversion module 40 can be omitted.

Figure 2:
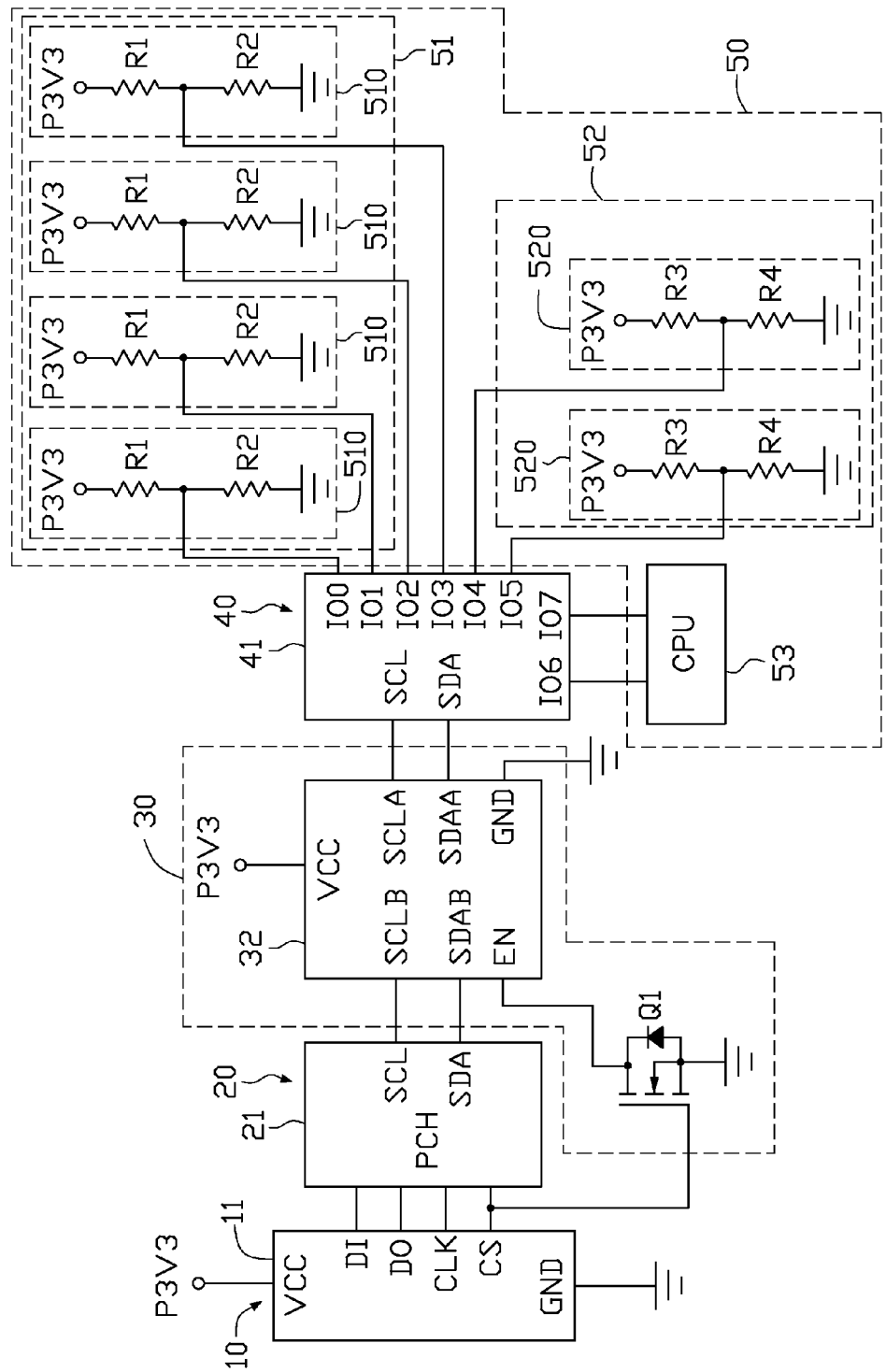
FIG. 2 is a circuit diagram of an example embodiment of the loading system of FIG. 1.

FIG. 2 illustrates a circuit diagram of the loading system 100. The first storage module 10 can comprise a basic input output system (BIOS) memory 11. The BIOS memory 11 can comprise a power pin VCC, a ground pin GND, an input pin DI, an output pin DO, a clock pin CLK, and a chip selection pin CS. The power pin VCC is coupled to a power supply P3V3. The ground pin GND is coupled to ground. The input pin DI, output pin DO, clock pin CLK, and chip selection pin CS are coupled to the first control module 20 through a serial peripheral interface (SPI) bus. The BIOS memory 11 stores a BIOS program for loading on the motherboard.

The first control module 20 can comprise a platform controller hub (PCH) 21. A clock pin SCL and a data pin SDA of the PCH 21 are coupled to the first switch module 30 through an inter-integrated circuit (I2C) bus.

The first switch module 30 can comprise an electronic switch Q1 and a switch chip 32. In at least one embodiment, the electronic switch Q1 is an n-channel field-effect transistor (FET). The switch chip 32 is configured to transmit an I2C signal. The electronic switch Q1 can comprise a control terminal, a first terminal, and a second terminal. The switch chip 32 can comprise an enable pin EN, a power pin VCC, a clock output pin SCLB, a data output pin SDAB, a clock input pin SCLA, a data input pin SDAA, and a ground pin GND. The control terminal is coupled to the chip selection pin CS of the BIOS memory 11. The first terminal is coupled to the enable pin EN. The second terminal is coupled to ground. The power pin VCC is coupled to the power supply P3V3. The clock output pin SCLB and the data output pin SDAB are coupled to the clock pin SCL and the data pin SDA of the PCH 21 respectively, through the I2C bus. The clock input pin SCLA and the data input pin SDAA are coupled to the conversion module 40. The ground pin GND is coupled to ground.

The conversion module 40 can comprise a deserializer 41. The deserializer 41 can comprise a clock pin SCL, a data pin SDA, and first to eighth input and output pins IO0-IO7. The clock pin SCL and the data pin SDA are coupled to the clock input pin SCLA and the data input pin SDAA of the switch chip 32 respectively. The first to eighth input and output pins IO0-IO7 are coupled to the type module 50.

The type module 50 can comprise a structure unit 51, a function unit 52, and a CPU 53. The structure unit 51 is coupled to the first to fourth input and output pins IO0-IO3, and is configured to output eight different kinds of structure signals. The function unit 52 is coupled to the fifth and sixth input and output pins IO4, IO5, and is configured to output four different kinds of function signals. The CPU 53 is coupled to the seventh and eighth input and output pins IO6, IO7, and is configured to output four different kinds of CPU signals. The structure unit 51 can comprise four first indication units 510. Each first indication unit 510 can comprise resistors R1, R2. A first terminal of the resistor R1 is coupled to the power supply P3V3. A second terminal of the resistor R1 is coupled to ground through the resistor R2. The second terminals of the four resistors R1 of the four first indication units 510 are coupled to the first to fourth input and output pins IO0-IO3 of the deserializer 41 respectively. The function unit 52 can comprise two second indication units 520. Each second indication unit 520 can comprise resistors R3, R4. A first terminal of the resistor R3 is coupled to the power supply P3V3. A second terminal of the resistor R3 is coupled to ground through the resistor R4. The second terminals of the two resistors R3 of the two second indication units 520 are coupled to the fifth and sixth input and output pins IO4, IO5 of the deserializer 41 respectively.

In use, the motherboard being of a first type, that is, when the resistors R1 of the four first indication units 510 are not soldered on the motherboard and the resistors R2 of the four first indication units 510 are soldered. Further, the resistors R3 of the two second indication units 520 are not soldered on the motherboard and the resistors R4 of the two second indication units 520 are soldered. The CPU 53 outputs a first CPU signal. Therefore, low level signals are received by the first to sixth input and output pins IO0-IO5 of the deserializer 41, and the first CPU signal is received by the seventh and eighth input and output pins IO6, IO7 of the deserializer 41. The deserializer 41 converts the first CPU signal of the motherboard to a first type signal in form of I2C, and outputs the first type signal to the switch chip 32.

When the BIOS program stored in the BIOS memory 11 is needed to be loaded, a low level signal is outputted from the PCH 21 to the chip selection pin CS of the BIOS memory 11. The low level signal is received by the control terminal of the electronic switch Q1, and the electronic switch Q1 is turned off. The switch chip 32 is turned on, and the first type signal is outputted to the PCH 21. The PCH 21 receives the first type signal, and controls the BIOS memory 11 to update the BIOS program, to match functions of a motherboard which is of a first type. Therefore, the BIOS program required currently can be loaded, suitable for the first type of motherboard.

The motherboard being of a second type, that is, when the resistor R1 coupled to the first input and output pin IO0 of the deserializer 41 is soldered on the motherboard and the resistor R2 coupled to the first input and output pin IO0 of the deserializer 41 is not soldered. Further, the three resistors R1 coupled to the second to fourth input and output pins IO1-IO3 of the deserializer 41 are not soldered on the motherboard and the three resistors R2 coupled to the second to fourth input and output pins IO1-IO3 of the deserializer 41 are soldered. In addition, the resistors R3 of the two second indication unit 520 are not soldered on the motherboard and the resistors R4 of the two second indication unit 520 are soldered. The CPU 53 outputs a second CPU signal. Therefore, a high level signal is received by the first input and output pin IO0 of the deserializer 41, low level signals are received by the second to sixth input and output pins IO1-IO5 of the deserializer 41, and the second CPU signal is received by the seventh and eighth input and output pins IO6, IO7 of the deserializer 41. The deserializer 41 converts the second CPU signal of the motherboard to a signal of a second type in form of I2C, and outputs second type signal to the switch chip 32.

When the BIOS program stored in the BIOS memory 11 is needed to be loaded, a low level signal is outputted from the PCH 21 to the chip selection pin CS of the BIOS memory 11. The low level signal is received by the control terminal of the electronic switch Q1, and the electronic switch Q1 is turned off. The switch chip 32 is turned on, and the second type signal is output to the PCH 21. The PCH 21 receives the second type signal, and controls the BIOS memory 11 to update the BIOS program, to match functions of a second type of motherboard. Therefore, the BIOS program required, suitable for the second type of the motherboard, is loaded.

Figure 3:
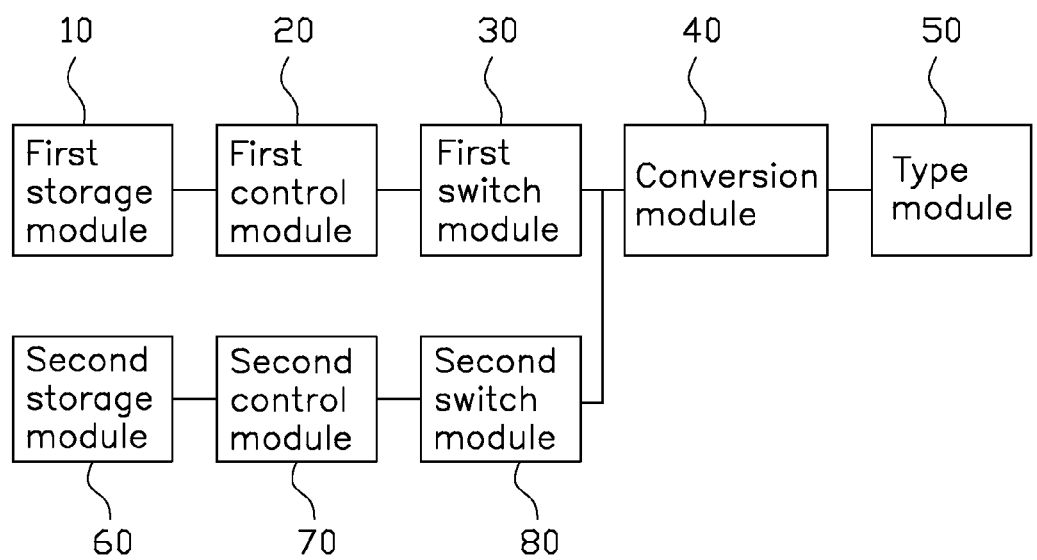
FIG. 3 is a block diagram of a second example embodiment of the loading system further comprising a second storage module, a second control module, and a second switch module.

FIG. 3 illustrates a second embodiment of the loading system 100. The loading system 100 in the second embodiment further comprises a second storage module 60, a second control module 70, and a second switch module 80 on the basis of the loading system 100 in the first embodiment. The second control module 70 is coupled between the second storage module 60 and the second switch module 80. The second switch module 80 is coupled to the conversion module 40.

When a program stored in the first storage module 10 and a program stored in the second storage module 60 are needed to be loaded, the first and second switch modules 30, 80 are turned on. The conversion module 40 converts a type signal outputted from the type module 50 and outputs the type signal converted to the first control module 20 and the second control module 70, through the first switch module 30 and the second switch module 80, respectively. The first and second control modules 20, 70 load the programs stored in the first and second storage modules 10, 60 selectively, according to the type signal received.

Figure 4:
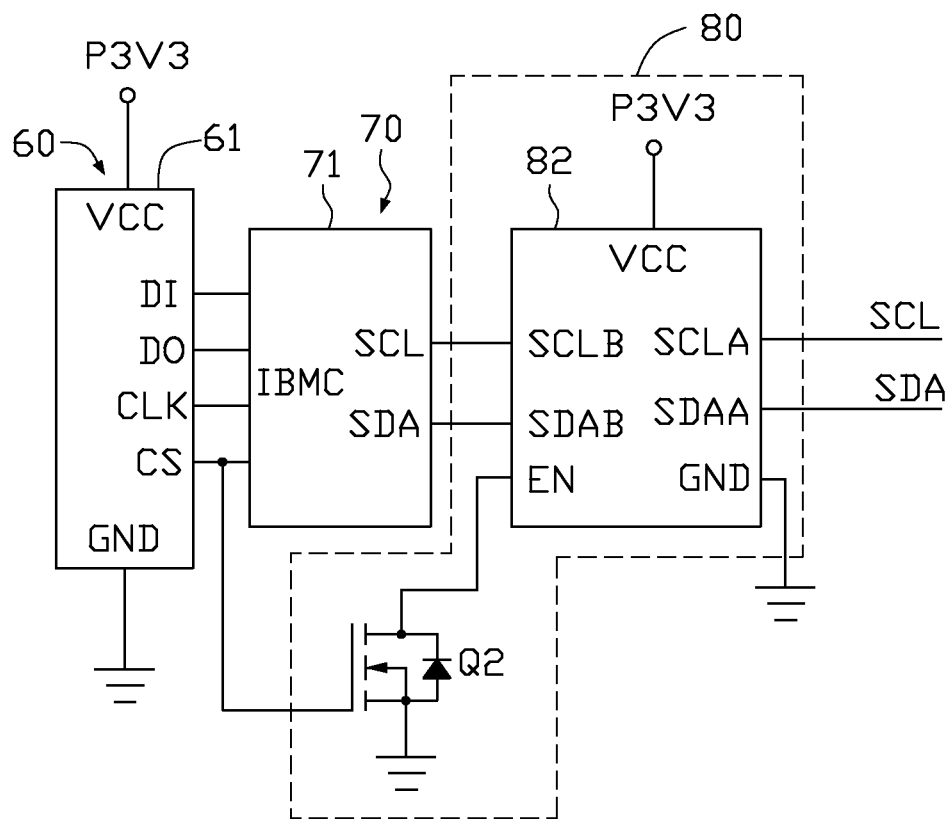
FIG. 4 is a circuit diagram of the second storage module coupled to the second control module and the second switch module of the loading system of FIG. 3.

FIG. 4 illustrates a circuit diagram of the second storage module 60 coupled to the second control module 70 and the second switch module 80 of the loading system 100 in the second embodiment. The second storage module 60 can comprise a firmware (FW) memory 61. The FW memory 61 can comprise a power pin VCC, a ground pin GND, an input pin DI, an output pin DO, a clock pin CLK, and a chip selection CS. The power pin VCC is coupled to the power supply P3V3. The ground pin GND is coupled to ground. The input pin DI, output pin DO, clock pin CLK, and chip selection CS are coupled to the second control module 70 through an SPI bus. The FW memory 61 stores a FW program for loading on the motherboard.

The second control module 70 can comprise an integrated baseboard management controller (IBMC) 71. A clock pin SCL and a data pin SDA of the IBMC 71 are coupled to the second switch module 80 through an I2C bus.

The second switch module 80 can comprise an electronic switch Q2 and a switch chip 82. The connections between the electronic switch Q2 and the switch chip 82 are the same as the connections between the electronic switch Q1 and the switch chip 32 in the first switch module 30. A clock input pin SCLA and a data input pin SDAA of the switch chip 82 are coupled to the conversion module 40. The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A loading system comprising:
a first storage module;
a first control module coupled to the first storage module;
a first switch module coupled to the first control module;
a type module coupled to the first switch module and configured to determine a type of a motherboard; and
a conversion module coupled between the first switch module and the type module;
wherein the first switch module comprises a switch chip, and the switch chip comprises a clock input pin and a data input pin; the conversion module comprises a deserializer, the deserializer comprises a clock pin, a data pin, and the clock pin and the data pin of the deserializer are coupled to the clock input pin and the data input pin of the switch chip respectively; and
wherein when a program stored in the first storage module is needed to be loaded, the first switch module is turned on, the type module outputs a type signal to the first control module through the first switch module, the first control module loads the program selectively, according to the type signal received.

2. The loading system of claim 1, wherein the deserializer is configured to convert the type signal to a corresponding signal for matching the first control module.

3. The loading system of claim 2, wherein the first storage module comprises a basic input and output system (BIOS) memory, the BIOS memory comprise a power pin, a ground pin, an input pin, an output pin, a clock pin, and a chip selection pin, the power pin is coupled to a power supply, the ground pin is coupled to ground, the input pin, the output pin, the clock pin, and the chip selection are coupled to the first control module.

4. The loading system of claim 3, wherein the first control module comprises a platform controller hub (PCH), a clock pin and a data pin of the PCH is coupled to the first switch module.

5. The loading system of claim 4, wherein the first switch module further comprises an electronic switch, the electronic switch comprise a control terminal, a first terminal, and a second terminal, the switch chip further comprise an enable pin, a power pin, a clock output pin, a data output pin, and a ground pin, the control terminal is coupled to the chip selection of the BIOS memory, the first terminal is coupled to the enable pin, the second terminal is coupled to ground, the power pin is coupled to the power supply, the clock output pin and the data output pin are coupled to the clock pin and the data pin of the PCH respectively, the clock input pin and the data input pin are coupled to the conversion module, the ground pin is coupled to ground, wherein when the control terminal receives a low level signal, the electronic switch is turned off.

6. The loading system of claim 5, wherein the deserializer further comprises first to eighth input and output pins the first to eighth input and output pins are coupled to the type module.

7. The loading system of claim 6, wherein the type comprises a structure unit, a function unit, and a CPU, the structure unit is coupled to the deserializer and configured to output at least two different kinds of structure signals, the function unit is coupled to the deserializer configured to output at least two different kinds of function signals, the CPU is coupled to the deserializer and configured to output at least two different kinds of CPU signals.

8. The loading system of claim 7, wherein the structure unit comprise at least one first indication unit, the first indication unit comprises a first resistor and a second resistor, a first terminal of the first resistor is coupled to the power supply, a second terminal of the first resistor is coupled to ground through the second resistor, the second terminal of the first resistor is coupled to the deserializer, the function unit comprises at least one second indication unit, the second indication unit comprises a third resistor and a fourth resistor, a first terminal of the third resistor is coupled to the power supply, a second terminal of the third resistor is coupled to ground through the fourth resistor, the second terminal of the third resistor is coupled to the deserializer.

9. A loading system comprising:
a first storage module; a second storage module;
a first control module coupled to the first storage module;
a second control module coupled to the second storage module;
a first switch module coupled to the first control module;
a second switch module coupled to the second control module;
a conversion module coupled to the first and second switch modules; and
a type module coupled to the conversion module and configured to determine a type of a motherboard;
wherein the first switch module comprises a switch chip, and the switch chip comprises a clock input pin and a data input pin; the conversion module comprises a deserializer, the deserializer comprises a clock pin, a data pin, and the clock pin and the data pin of the deserializer are coupled to the clock input pin and the data input pin of the switch chip respectively; and
wherein when a program stored in the first storage module and a program stored in the second storage module are needed to be loaded, the first and second switch modules are turned on, the type module outputs a type signal to the conversion module, the conversion module is configured to convert the type signal to a corresponding signal matching the first and second control modules and outputs the corresponding signal to the first and second control modules, through the first and second switch modules respectively, the first and the second control modules load the programs selectively, according to the corresponding signal received respectively.

10. The loading system of claim 9, wherein the second storage module comprises a firmware memory, the firmware memory comprises a power pin, a ground pin, an input pin, an output pin, a clock pin, and a chip selection, the power pin is coupled to a power supply, the ground pin is coupled to ground, the input pin, the output pin, the clock pin, and the chip selection are coupled to the second control module, the second control module comprises an integrated baseboard management controller (IBMC), and the IBMC is coupled to the second switch module.

* * * * *